US006430933B1

(12) United States Patent
Keller

(10) Patent No.: US 6,430,933 B1
(45) Date of Patent: Aug. 13, 2002

(54) OSCILLATION ATTENUATION IN COMBUSTORS

(75) Inventor: Jakob Keller, deceased, late of Wohlen (CH), by Maria Keller-Schärli,Vera Keller, Georg Keller, administrators

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/392,791

(22) Filed: Sep. 9, 1999

(30) Foreign Application Priority Data

Sep. 10, 1998 (EP) ........................................... 98810901

(51) Int. Cl.[7] ................................................ F02C 7/24

(52) U.S. Cl. ............................ 60/772; 60/725; 60/737; 60/760; 431/115

(58) Field of Search ............................... 60/39.02, 725, 60/737, 750, 760; 431/47, 1, 116

(56) References Cited

U.S. PATENT DOCUMENTS

| | | | | |
|---|---|---|---|---|
| 3,744,242 A | | 7/1973 | Stettler et al. | |
| 3,826,083 A | | 7/1974 | Brandon et al. | |
| 3,974,647 A | | 8/1976 | Lewis et al. | |
| 4,345,426 A | * | 8/1982 | Egnell et al. | 60/39.23 |
| 5,201,650 A | * | 4/1993 | Johnson | 431/9 |
| 5,584,182 A | * | 12/1996 | Althaus et al. | 60/737 |
| 5,655,903 A | * | 8/1997 | Fischer | 431/353 |

FOREIGN PATENT DOCUMENTS

| | | |
|---|---|---|
| DE | 43 04 213 A1 | 8/1994 |
| DE | 196 40 980 A1 | 7/1998 |
| EP | 0 576 717 A1 | 1/1994 |
| EP | 0 801 268 A2 | 10/1997 |

OTHER PUBLICATIONS

Keller, Jakob J., et al., "On the Use of Helmholtz Resonators As Sound Attenuators," Z Agnew Math Phys, vol. 46, 1995, pp. 297–326.

* cited by examiner

*Primary Examiner*—Charles G. Freay
(74) *Attorney, Agent, or Firm*—Burns, Doane, Swecker & Mathis, L.L.P.

(57) ABSTRACT

The devices and methods according to the invention are used to attenuate acoustic and/or thermoacoustic oscillations in a combustor. The combustor may be, in most cases, constructed as a premixing combustor with low emissions of noxious substances and includes a fluid supply device, an antechamber, a premixing device, and a combustion chamber. The fluid is supplied to the combustion chamber completely or almost completely through the front panel located in the front. The combustion chamber has at least one recirculation opening for attenuating the oscillations. It is furthermore advantageous that an attenuation volume and an injector be provided. The recirculation opening preferably merges at least in part with the attenuation volume. By means of the injector, the combustor is supplied with a more compressed fluid in order to ensure an adequate and clear pressure drop across the combustor.

23 Claims, 6 Drawing Sheets

OSCILLATION ATTENUATION IN COMBUSTORS

TECHNICAL FIELD

The invention relates to devices and methods for attenuating acoustic and/or thermoacoustic oscillations in combustors, in particular in combustors of gas turbines.

BACKGROUND OF THE INVENTION

Combustors today are designed primarily with an eye toward the lowest possible formation of noxious substances, and thus with the lowest possible discharge of noxious substances during the operation of the combustor. Significant noxious substances formed during combustion are nitrogen oxides which, depending upon the atmospheric altitude in which they are discharged, can cause either a decrease or increase in ozone. Nitrogen oxides (NOx) form at very high temperatures. Such high temperatures occur during combustion with, in particular, a slight excess of air, i.e. a rich combustion. Such conditions exist, for example, in case of an insufficient atomization and gasification of a liquid fuel in the immediate area around fuel droplets. In order to prevent the formation of nitrogen oxides, today's combustors are mostly designed as premixing combustors. In this case, the fuel, which is mostly gaseous in stationary gas turbines, is first mixed in a premixing device with air prior to the actual combustion. The premixing device often consists of one or more burners, such as are described, for example, in publication DE 43 04213 A1. Furthermore, the admixture of secondary air during the combustion process is now either absent or almost absent in modern combustors. The air supplied for combustion therefore flows completely or almost completely through one or more burners into the combustion chamber at its inlet. This causes a highly homogeneous gas/air mixture to form in the combustion chamber. Thus, a local fuel/air mixture that is too rich can be substantially prevented. As a result, the nitrogen oxide formation can be reduced.

The construction of such a so-called Low-$NO_x$ combustor differs from standard combustors in particular in the air supply. As was already mentioned, no secondary air, or almost none, is mixed in with the internal flow of the combustion chamber downstream from the combustion chamber inlet. In standard combustors, secondary air is supplied via bores in the combustion chamber wall, in particular for cooling the wall housing of the internal combustion chamber flow. The secondary air flowing into the combustion chamber also resulted in a stabilization of the combustion flow. In addition to an aerodynamic stabilization of the flame, the inflowing secondary air also resulted in a strong acoustic attenuation inside the combustor. Wall pressure fluctuations in the combustor undergo a particularly strong attenuation due to the incoming secondary air flow, particularly if the secondary air mass flux is large and the entry speed is low. Because of this high acoustic pressure level, the combustor in return had a high attenuation capacity with respect to the acoustic and/or thermoacoustic oscillations of the combustor which were attenuated by dissipation. The absence of a secondary air supply in the combustion flow in modern combustors, in contrast, has led to a low acoustic attenuation of the combustors. Acoustic and/or thermoacoustic oscillations occur in combustors as a result of different causes. Inhomogeneous temperature distributions in the combustion flow when passing through the turbine result, for example, in inhomogeneous pressure and therefore thermoacoustic oscillations because of a spatially or temporarily inhomogeneous enthalpy conversion. These oscillations, in principle, cannot be prevented. In the presence of a too low attenuation and in relation to the acoustic behavior of the combustor, for example of the natural frequencies, these oscillations may, however, result in undesired high pressure amplitudes. In addition to a high mechanical strain of the combustor due to the pressure change amplitudes, this results in increased emissions of noxious substances as a result of inhomogeneous combustion and, in the extreme case, in an extinguishing of the flame.

To attenuate such acoustic and/or thermoacoustic oscillations, Helmholtz resonators, as described in the publication by J. J. Keller and E. Zauner, "On The Use Of Helmholtz Resonators As Sound Attenuators", Zangew Math Phys 46, 1995, p. 297–327, were used in the past. These Helmholtz resonators are hereby connected at least on the inlet side to the combustion chamber. But Helmholtz resonators function only in a narrow frequency band around a base frequency. This does not therefore provide any broad-band attenuation of different oscillation frequencies.

SUMMARY OF THE INVENTION

The invention therefore is based on the objective of effectively attenuating acoustic and/or thermoacoustic oscillations in a combustor of a turbo machine, in particular a gas turbine, over the largest possible frequency range.

According to the invention this objective is realized in that the combustor has at least one fluid supply device and one combustion chamber, and that the combustion chamber furthermore has at least one recirculation opening for attenuating acoustic and/or thermoacoustic oscillations. The recirculation opening provides a local pressure compensation for acoustic and/or thermoacoustic oscillations, resulting in a destructive interference of acoustic waves and their reflections. Depending on the pressure conditions in front of and behind the recirculation opening, an inflow or outflow of fluid through the recirculation opening occurs with acoustic and/or thermoacoustic oscillations. Naturally, a perfect pressure compensation would require that the flow speed would just disappear. It is useful that the recirculation opening merges into the fluid inflow to the combustion chamber, i.e. it flows in a useful manner into the fluid supply device, But the recirculation opening also may additionally merge with another volume. If it merges with the fluid inflow, the fluid flowing from the combustion chamber is transported along with the fluid flowing into the combustion chamber. This results in a reentry of the flow into the combustor, and thus in a recirculation of the fluid flowing out of the combustion chamber. But given the appropriate pressure conditions, the fluid from the fluid infeed can also flow through the recirculation opening into the combustion chamber. Without restricting either of the two possible flow directions through the recirculation opening, however, as a rule, the present invention is concerned primarily with the outflow of fluid from the combustion chamber. With a suitable, preferable design of the combustor, a useful, primarily very small outflow of fluid through the recirculation opening from the combustion chamber occurs. Furthermore, while not limiting the general application, only the recirculation of the fluid will be considered for reasons of simplification. It was found that acoustic and/or thermoacoustic oscillations of the combustor are attenuated in a sustained manner as a result of the pressure compensation near the recirculation openings.

At least part of the fluid supply device preferably extends so as to immediately adjoin the outside of the combustion chamber wall. Along with the supply of a fluid, in most cases air, to the combustion chamber of the combustor, this arrangement of the fluid supply device causes the combustion chamber wall on the outside of the combustion chamber to be cooled convectively. The fluid in the fluid supply device in this case therefore flows in reverse direction to the flow in the combustion chamber. It is useful that the fluid supply device merges into an antechamber, and from there into the combustion chamber. It is hereby desired that the most homogeneous flow status of the fluid that is possible develops in this antechamber. The flow status of the fluid relates to the static pressure, temperature, and flow speed of the fluid. An inhomogeneous flow status would lead to an inhomogeneous inflow into the combustion chamber of the combustor, and finally to an inhomogeneous combustion occurring in the combustion chamber. A more simple version of the combustor may be formed which eliminates this antechamber. It is useful that the fluid flows completely or almost completely on the entry side, preferably via a front panel located on the entry side, into the combustion chamber. The combustion chamber is frequently constructed in a circular or annular shape, whereby the front panel terminates the combustion chamber on the entry side. Because of the complete or almost complete infeeding of the fluid into the combustion chamber via the front panel, the combustion taking place in the combustion chamber from the outset has available a fluid quantity that is sufficient for a combustion process with low quantities of noxious substances. For the purpose of a low-noxious combustion, it is furthermore advantageous that the combustor is constructed as a premixing combustor with a premixing device. A premixing of the mostly gaseous fuel with air takes place in the premixing device. The premixing device which is preferably constructed as a burner is advantageously located in front of the combustion chamber and preferably merges into the combustion chamber at the level of the front panel.

The recirculation opening is preferably located in the front part of the combustion chamber on the combustion chamber wall and/or the front panel. The recirculation opening in the front part of the combustion chamber causes the acoustic oscillation in the area of a primary combustion zone to have a pressure node. But since the pressure oscillation amplitude in the primary combustion zone is maintained near zero, it is also not possible for any strong sound stimulation to occur according to the "Rayleigh criterion". The combustion chamber therefore presents in its front part an at least partially open oscillation chamber.

In an advantageous arrangement, the recirculation opening is connected with the fluid supply device and/or the antechamber. If as a result of an acoustic and/or thermoacoustic oscillation fluid flows through the recirculation opening from the combustion chamber, this fluid thus flows into the fluid supply device and/or the antechamber. From there, the fluid flowing from the combustion chamber then flows back into the combustion chamber. The fluid flowing out of the combustion chamber thus recirculates.

It is useful that the recirculation opening is constructed as a nozzle, whereby the nozzle merges advantageously with the fluid supply device and/or the antechamber. The nozzle preferably has a constant cross-section, so that the speed of the fluid flowing from the combustion chamber is neither accelerated nor delayed significantly. By means of this nozzle the fluid flowing from the combustion chamber can be specifically added to the flow in the fluid supply device and/or the antechamber. This means that in particular the inflow direction of the fluid flowing from the combustion chamber as well as the point of the merging are freely selectable.

If the recirculation opening first merges with a volume, and then merges indirectly via this volume with the fluid supply device and/or the antechamber, then the point of merging of the interposed volume with the fluid supply device and/or the antechamber are generally to be considered as a merging point of the recirculation opening with the fluid supply device and/or the antechamber also, if this is not separately distinguished.

The recirculation opening is preferably designed so that the narrowest cross-section of the recirculation opening is clearly larger than the narrowest cross-section of a corresponding Helmholtz resonator. A corresponding Helmholtz resonator is specified by the natural acoustic frequency of the combustor, and thus by the rated frequency of the Helmholtz as well as the required attenuation performance. It is especially preferred that the narrowest cross-section of the recirculation opening has a cross-section area that corresponds approximately to ten times the cross-section area of the corresponding Helmholtz resonator. This larger cross-section surface of the recirculation opening in comparison to the Helmholtz resonator is particularly advantageous from the viewpoint of the broadest possible range of action in relation to the oscillation frequencies and oscillation amplitudes to be attenuated. In contrast to a Helmholtz resonator, the sound attenuator suggested here does not provide a resonant sound attenuation. Therefore, the open attenuator cross-section must be greater by a magnitude of about one for the same attenuation performance.

The flow of a real fluid through the combustor principally is subject to loss. The fluid flowing into the combustion chamber thus has a lower total pressure than the fluid in the fluid supply device or in the antechamber. If, due to a static pressure drop, fluid flows through the recirculation opening from the combustion chamber into the fluid supply device and/or the antechamber, the fluid flowing from the combustion chamber thus has a lower total pressure than the fluid in the fluid supply device and/or the antechamber. As a result the mean total pressure in the fluid supply device and/or the antechamber drops downstream from the merging point of the recirculation opening if fluid flows out of the combustion chamber. It is useful that at least one injector is arranged in the combustor in such a way that it merges in an area downstream from the recirculation opening into the fluid supply device and/or the antechamber. Additional fluid can be added to the flow via this injector. The function of the injector is to at least compensate the total pressure drop of the flow across the burner, i.e. the total pressure drop of the flow between the merging point of the recirculation opening with the fluid supply device and/or the antechamber and the corresponding level in the combustion chamber. Additionally the fluid additionally supplied by the injector is advantageously added to the flow at a flow direction adapted to the surrounding fluid flow. It is useful that the injector is constructed as a nozzle with a tapered cross-section. As a result of the additionally added fluid, the mean total pressure of the fluid in the fluid supply device and/or the antechamber rises particularly downstream from the merging point of the injector. As a result a stable rise in pressure that just compensates the pressure drop across the burner occurs in the suction branch of the injector.

It is particularly useful that both the fluid supply device and the injector are supplied from one and the same fluid reservoir, Preferably the free ends of the fluid supply device and of the injector are connected with the fluid reservoir for this purpose.

It is furthermore advantageous that the combustion chamber has the largest possible attenuation volume. The attenuation volume hereby can be constructed as an attenuation chamber. The attenuation volume is arranged so that at least part of the fluid flowing out of the combustion chamber through the recirculation opening flows into the attenuation volume. It is also useful that the attenuation volume is connected to the fluid supply device and/or the antechamber. Compared to the primary zone of the combustion chamber, the attenuation volume has an approximately equal or larger volume. The primary zone is hereby the area of the combustion chamber in which the primary combustion takes place. It was found that the combination of a recirculation opening with an attenuation volume in the form of a buffer volume results in an especially effective oscillation attenuation, particularly for a compressible fluid.

The attenuation volume, in particular the inflow and outflow to the attenuation volume, is preferably designed so that the fluid in the attenuation volume in comparison to the fluid in the combustion chamber has a compensated static pressure at a base load, and a slightly lower static pressure at a full load. With a base load, this results either in no or only a very small flow through the recirculation openings into the attenuation volume. With a full load, the slight overpressure in the combustion chamber results in a continuous outflow of fluid from the combustion chamber through the recirculation opening. By using such a design it is ensured that no fluid will flow through the recirculation opening into the combustion chamber at a full load. An inflow of fluid through the recirculation opening into the combustion chamber would result in a higher emission of noxious substances from the combustion chamber. If no attenuation volume has been provided, it is useful that the area where the recirculation opening merges with the fluid supply device and/or the antechamber is designed so that the fluid in the area of the merging point, when compared to the fluid in the combustion chamber, has a compensated static pressure at a base load, and has a slightly lower static pressure at a full load.

It is furthermore useful that in addition cooler fluid, for example from the fluid supply device and/or the antechamber, flows into the attenuation volume. This prevents too high temperatures from occurring in the attenuation volume.

In a particularly useful design, the attenuation volume has a variable volume size. This makes it possible to vary and optimize the attenuation characteristics of the attenuation volume in a simple manner.

The fluid supply device is advantageously constructed as a Venturi nozzle in the area where it merges with the recirculation opening. The narrowest cross-section of the Venturi nozzle is preferably located directly near the site where the recirculation opening merges. If an attenuation volume is provided, the Venturi nozzle is advantageously arranged in the area where the attenuation volume merges with the fluid supply device, and the narrowest cross-section of the Venturi nozzle is located preferably directly at the point where the attenuation volume merges with the fluid supply device. In particular, by providing a Venturi nozzle, the part of the fluid mass flux through the fluid supply device can be increased in relation to the fluid mass flux through the injector. It is useful that this reduction of the fluid mass flux through the injector is accomplished in a simple manner by reducing the flow cross-section of the injector. As a result of providing the Venturi nozzle, a markedly reduced static pressure of the fluid flow in the fluid supply device occurs in the area of the narrowest cross-section. With the preferred arrangement of the narrowest cross-section of the Venturi nozzle in the immediate area of the merging point of the recirculation opening or attenuation volume into the fluid supply device, the static pressure occurring here corresponds approximately to the static pressure in the combustion chamber. Since at the same time the flow speed of the fluid in the combustion chamber is clearly lower, this therefore results in a markedly lower total pressure of the fluid in the combustion chamber than in the fluid supply device and/or antechamber. Because of the total pressure drop of the flow above the combustor, a stable and directed flow of the fluid in the combustor is substantially ensured even without or only with a small quantity of fluid additionally supplied via an injector. Furthermore, an increased pressure loss in the combustor occurs as a result of providing the Venturi nozzle.

BRIEF DESCRIPTION OF THE DRAWINGS

The drawings show exemplary embodiments of the invention.

DETAILED DESCRIPTION OF THE INVENTION

Figure 1:
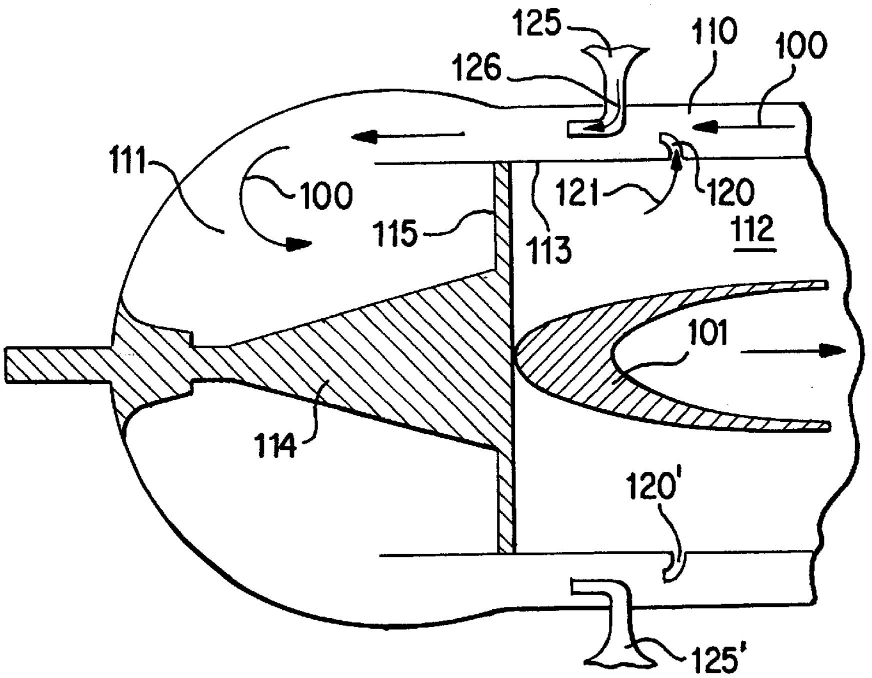
FIG. 1 shows a section through a combustor with an arrangement of a recirculation opening and an injector according to the invention.

FIG. 1 shows an embodiment of the invention in the form of a longitudinal section through a combustor. The combustor includes of a fluid supply device 110, an antechamber 111, and a combustion chamber 112. The combustor shown may also be constructed as a premixing combustor with a premixing device 114. The premixing device 114 is arranged in the front at the front panel 115 of the combustion chamber 112. The combustor shown can be constructed both as a tubular combustor with a cylindrical cross-section or as an annular combustor with an annular cross-section that is concentric around the machine axis. In modern turbo machines which are in most cases constructed very compactly, the latter construction is often preferred. Without limiting the application of the invention in reference to its use in a preferred combustor design, the following will assume that the combustors shown in the figures are constructed as annular combustors. This means that in the illustrations accordingly only the section above the machine axis is shown.

The fluid 100 is supplied to the combustion chamber 112 with the help of the fluid supply device 110. The fluid supply device 110 may include separate pipelines which merge either with the antechamber 111 or directly with the combustion chamber 112. In particular, in the case of annular combustors, a construction of the fluid supply device 110 in the form of one or more annular flow channels is preferable. This ensures an inflow to the combustion chamber that is as uniform as possible over the perimeter of the combustor. The fluid supply device 110 shown in FIG. 1 consists of two flow channels that are arranged concentrically on the top (housing side) and bottom (hub side) of the combustor, directly adjoining the outside wall of the combustion chamber 112. In addition to a supply of the fluid, this at the same time achieves a cooling of the wall of the combustor 112 as a result of the thermal transfer from the combustion chamber wall to the fluid. In the illustration, the fluid flows through the fluid supply device 110 from right to left, i.e. in counterflow direction to the actual flow of the combustion chamber 112. According to the illustration, the fluid flows from the fluid supply device 110 into the antechamber 111. On the one hand, the fluid in the antechamber 111 is deflected into the opposite flow direction. On the other hand, pressure differentials between the top and bottom of the fluid supply device 110 are compensated in the antechamber 111. This results in a relatively uniform inflow to the combustion chamber 112. In addition, the premixing device 114 constructed in the form of several burners distributed along the perimeter is located in the premixing chamber 111. The premixing device 114 is used to premix the mostly gaseous fuel with part of the supplied fluid 100, in most cases air. Due to the high flow speed in the premixing device 114, no combustion occurs here yet. It is the objective of the premixing device 114 to produce a homogeneous fuel/fluid mixture. From the antechamber 111, the fluid flows through the front panel 115 of the combustion chamber into the combustion chamber 112. The combustion 101 of the fuel/fluid mixture occurs in the combustion chamber 112. In contrast to earlier combustors, the combustion chamber 112 is no longer supplied with fluid via additional openings in the hubside and housing-side wall 113 of the combustion chamber. This additionally supplied fluid in the past served mainly to cool the combustion chamber wall. The hub-side and housing-side combustion chamber wall 113 shown in FIG. 1 in contrast is closed. No fluid is mixed with the internal combustion chamber flow any more along the combustion chamber 112. This results in a decreased production of nitrogen oxides during the combustion. A disadvantage hereby is, however, the also reduced attenuation capacity of the combustor for acoustic or thermoacoustic oscillations of the fluid flow in the combustor. Such oscillations may be created as a result of many causes in combustors, some of which have been described above. A stimulation or attenuation only takes place in relation to the acoustic behavior of the combustor. In many cases this leads to excessive pressure amplitudes of the oscillation. Unfavorable results include in particular increased emissions of noxious substances due to an inhomogeneous combustion, and an increased mechanical strain on the components due to the pressure change amplitudes that are produced. In the worst case, the flame may even be extinguished or a flashback may occur.

This is where the invention comes into play. In the section of the combustor shown in FIG. 1, one each recirculation opening 120, 120' was located according to the invention both at the housing-side and the hub-side wall of the combustion chamber 112 in the front part of the combustion chamber. The recirculation openings 120, 120' are in this case constructed as nozzles, each of which has a constant cross-section and merges with the fluid supply device 110. It is advantageous that the nozzles are bent so that the merging point of the fluid 121 exiting the combustion chamber 112 with the fluid supply device 110 takes place adapted to the flow of the fluid 100 in the fluid supply device 110. In principle, the invention also can be executed by providing only one recirculation opening. To obtain the most homogeneous pressure distribution in the combustion chamber 112 of the combustor possible, however, a distribution of the recirculation openings 120, 120' that is as symmetrical and uniform as possible is advantageous. FIG. 1 does not show the distribution of the recirculation openings along the perimeter of the combustor. It is preferred that recirculation openings are arranged along the perimeter of the annular combustor at several positions, preferably at identical intervals from each other. The constructive design of the recirculation openings 120, 120' and of the fluid supply device 110 at the merging points of the recirculation openings 120, 120' is implemented in view of the fact that in comparison to the fluid in the combustion chamber 112 the fluid in the area of the merging points of the recirculation openings 120, 120' has a compensated, static pressure at a base load, while it has a slightly lower static pressure at a full load. This ensures that during regular operation of the combustor between the base load and full load no or only a very small fluid mass flux will flow through the recirculation openings 120, 120' into the combustion chamber 112. In most cases a small quantity of fluid flows from the combustion chamber 112. As design parameters, in particular the flow speeds in the merging areas of the recirculation openings 120, 120' in this context can be freely selected in these areas because of the constructive design of the flow cross-sections of the fluid supply device 110.

In the case of acoustic and/or thermoacoustic oscillations of the fluid in the combustion chamber 112, a pressure compensation between the fluid flow in the combustion chamber 112 and the fluid flow in the fluid supply device 110 and thus also in the antechamber 111 takes place via the recirculation openings 120, 120'. Fluid 121 exiting from the combustion chamber 112 into the fluid supply device 110 is returned through the antechamber 111 to the combustion chamber 112, and thus recirculates. Because of dissipation losses of the recirculating fluid, 121, the oscillation is attenuated. The forced pressure compensation in the primary zone of the combustor there leads to destructive interference with the sound waves, and therefore to small pressure oscillation amplitudes in the area of the primary combustion zone. Given sufficiently large dimensions of the flow cross-sections of the recirculation openings 120, 120' and an adequate pressure drop in the recirculation area, oscillations over the entire frequency range are therefore attenuated or even completely attenuated.

Because of the viscosity of the fluid, total pressure losses of the fluid occur due to friction when it flows through the combustor. This means that the fluid present in the combustion chamber 112 has a lower total pressure than the fluid in the fluid supply device 110 or antechamber 111. However, the formation of a flow through the recirculation openings 120, 120' depends on the static pressure in the combustion chamber 112 and in the merging area of the recirculation openings 120, 120' in the fluid supply device 110. This makes it possible that, in spite of the lower total pressure, fluid flows from the combustion chamber 112 into the flow in the fluid supply device 110 and thus recirculates. Because of the lower total pressure, this is however only possible to a limited degree. In order to provide the fluid flow in the combustor with a distinct pressure drop in the entire combustor, even if part of the fluid is recirculated, the embodiment of the invention shown in FIG. 1 is provided according to the invention with two injectors 125, 125' in addition to the recirculation openings 120, 120'. These injectors 125, 125' are arranged so that they merge with the fluid supply device 110 in an area downstream from the recirculation openings 120, 120'. The injectors 125, 125' are in this case constructed as nozzles, each of which has a tapered flow cross-section. In the embodiment according to the invention as shown in FIG. 1, two injectors 125, 125' have been provided. Within the framework of the invention it is also possible to provide only a single injector. But in order to obtain the most uniform pressure distribution and therefore flow distribution both along the perimeter of the combustor and in radial extension, a multi-position arrangement will be preferable in most cases. In the embodiment of the invention shown in FIG. 1, two injectors 125, 125' have therefore been arranged at the hub-side and housing-side outside wall. In addition, another advantage is a multi-position injection along the perimeter of the combustor. With the help of these injectors 125, 125', the combustor is supplied with additional fluid 126. It is hereby useful that the added fluid 126 has a higher total pressure than the fluid 121 which recirculates from the combustion chamber 112. The injectors 125, 125' are preferably supplied from the same fluid reservoir as the fluid supply device 110. The supply for the injectors 125, 125' has not been shown in FIG. 1. In a turbo machine such a supply from a reservoir can be easily realized using a bypass channel. This bypass channel branches off at the outlet of the compressor preceding the combustor. While part of the fluid coming from the compressor flows with a relatively high total pressure loss through the fluid supply device 110, the remaining part of the fluid coming from the compressor is fed through the bypass channel to the combustor. The fluid 126 which has been supplied by the injectors 125, 125" to the combustor flow results in an increase in the mean total pressure of the flow downstream from the injection, and thus produces a sufficient pressure drop across the burner(s). As a result, the stabile operating range of the combustor is expanded by providing the injectors 125, 125' in the embodiment with the recirculation device according to the invention. The effectiveness of the injectors 125, 125' hereby depends strongly on the density ratio of the injected fluid to the surrounding fluid. If the surrounding fluid, i.e. the fluid that exited from the recirculation openings 120, 120' mixed with the fluid added in the fluid supply device 110, has a high temperature and therefore a low fluid density, the effectiveness of the injectors decreases. This causes the recirculation openings 120, 120' in combination with the injection via the injectors 125, 125' to constitute an inherently stabile control circuit.

Figure 2:
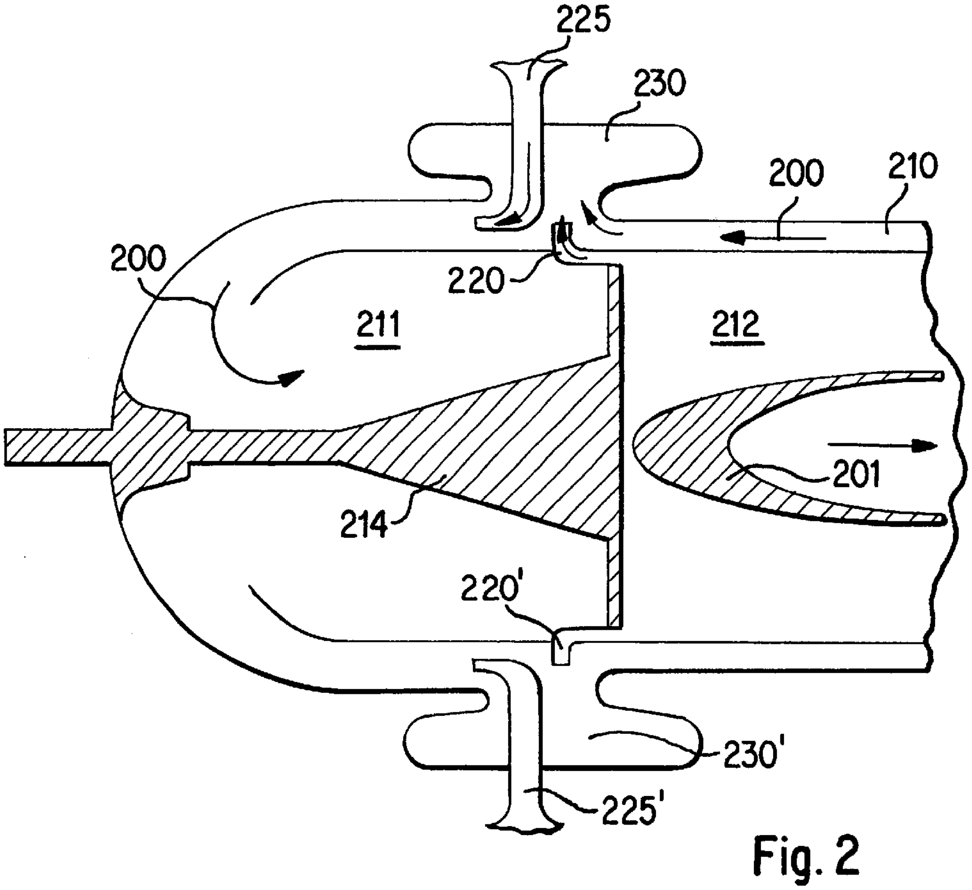
FIG. 2 shows a section through a combustor with an arrangement of a recirculation opening, an injector, and an attenuation volume according to the invention.

FIG. 2 shows a second embodiment of the invention in a section through another combustor. The combustor shown here is constructed similar to the combustor shown in FIG. 1. This similarity in the construction of the combustors according to FIGS. 1 and 2 does hereby not limit the general field of application of the invention in connection with other combustor designs. In essence, the combustor consists of a fluid supply device 210, an antechamber 211, a premixing device 214, and a combustion chamber 212 with a front panel that terminates the combustion chamber. The function hereby corresponds to the function of the combustor shown in FIG. 1. According to the invention, the combustor shown in FIG. 2 is provided with recirculation openings 220, 220'. These recirculation openings 220, 220' are provided at the front on the front panel, preferably distributed along the perimeter. The recirculation openings 220, 220' are here constructed in the form of nozzles, whereby the nozzles have a 90° angle and merge with the fluid supply device 210. Upstream from the merging point of the recirculation openings 220, 220' with the fluid supply device 210, two additional injectors 225, 225' have been provided according to the invention. By means of these injectors 225, 225', a more compressed fluid is injected into the fluid supply device 210 and thus also into the antechamber 211. This ensures the development of a clear pressure drop across the burners. The combustor according to the invention shown in FIG. 2 also has attenuation volumes 230, 230' located on the hub side and on the housing side. The attenuation volumes 230, 230' that advantageously extend over the entire perimeter of the combustor are here arranged on the outside of the combustor in such a way that the fluid exiting from the recirculation openings 220, 220' flows at least partially into the attenuation volumes 230, 230'. For this purpose, the attenuation volumes 230, 230' each are connected via an opening with the fluid supply device 210. Depending on the pressure conditions, this makes it possible for the fluid to flow from the fluid supply device 210 both into the attenuation volumes 230, 230', and vice versa. As a rule, an approximately identical static pressure will develop in the attenuation volumes 230, 230' as in the fluid supply device 210. The constructive design of the fluid supply device 210 also has been chosen advantageously in such a way that in the case of a base load a compensated static pressure, and in the case of a full load a slightly lower static pressure develops in the attenuation volumes 230, 230' when compared to the fluid in the combustion chamber 212. The attenuation volumes 230, 230' each are constructed with approximately the same volume as the primary zone of the combustor.

Fluid flowing as a consequence of acoustic and/or thermoacoustic oscillations from the combustion chamber 212 flows at least in part into the attenuation volumes 230, 230'. Because of the large volumes of the attenuation volumes 230, 230', the pressure fluctuations are clearly attenuated here. A pressure wave entering an attenuation volume 230 or 230' is hereby for the most part attenuated and is therefore not conducted further or reflected. Given adequate dimensions of both the flow cross-sections of the recirculation openings 220, 220' as well as of the attenuation volumes 230, 230', acoustic oscillations are attenuated over the entire frequency range.

Along with the fluid flowing into the attenuation volumes 230, 230' from the combustion chamber, fluid also flows from the fluid supply device 210 into the attenuation volumes 230, 230' in this shown embodiment of the invention.

This part of the cooler fluid ensures a lower mean temperature of the fluid in the attenuation volumes 230, 230' than the temperature of the fluid in the combustion chamber 212. The fluid in the attenuation volumes 230, 230' is then again delivered successively via the opening into the flow in the fluid supply device 210.

Figure 3:
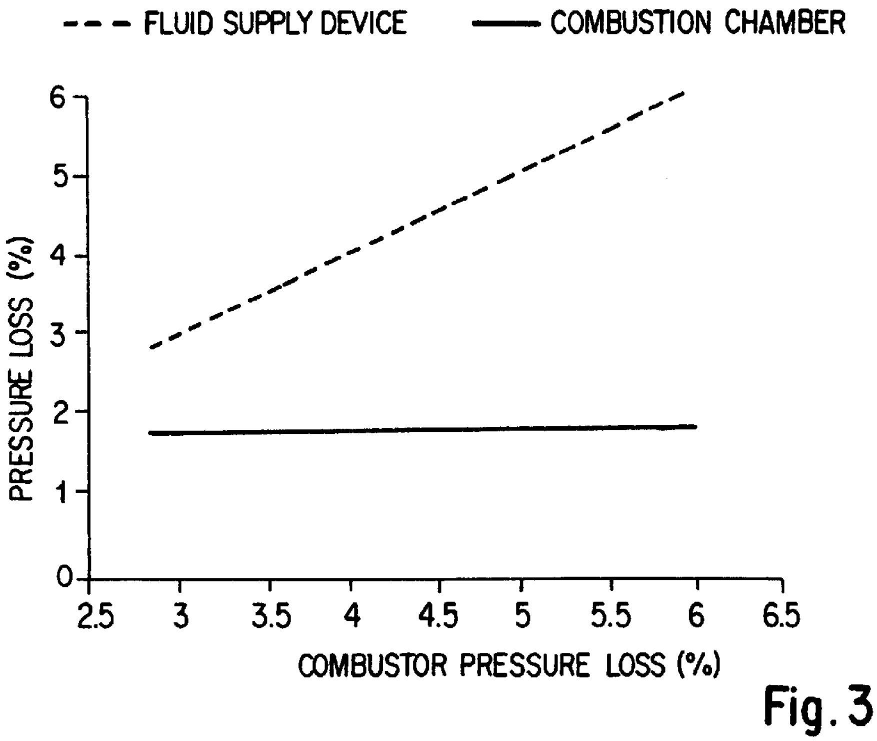
FIG. 3 shows, in reference to a combustor with a recirculation opening and an optimized injector, a graphic portrayal of the pressure loss in the fluid supply device and in the combustion chamber, each of which is given in relation to the pressure loss of the combustor.
Figure 4:
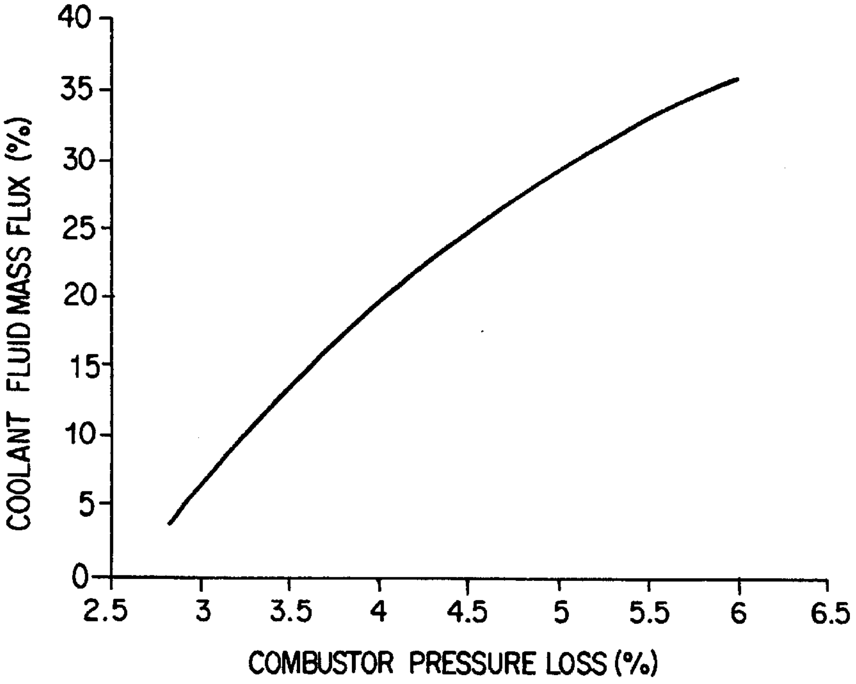
FIG. 4 shows, in reference to the combustor of FIG. 3, a graphic portrayal of the fluid mass throughput supplied through the fluid supply device to the combustor in percent, in relation to the pressure loss of the combustor.
Figure 5:
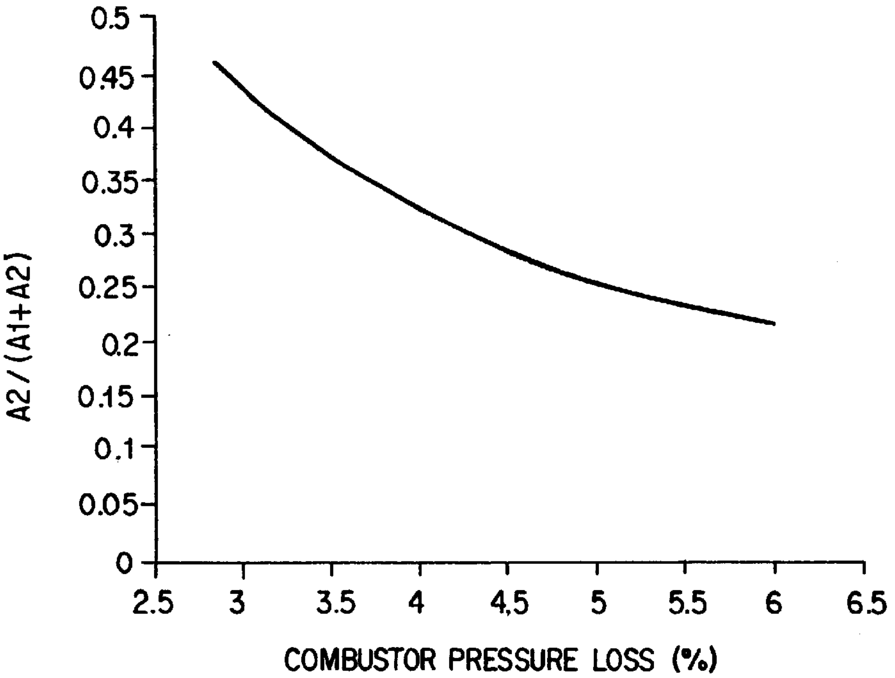
FIG. 5 shows, in reference to the combustor of FIG. 3, a graphic portrayal of the relative cross-section area of the optimized injector in relation to the pressure loss of the combustion chamber.

The results of an arithmetic simulation of a combustor corresponding to FIG. 2 are shown in FIGS. 3, 4, and 5. When using air as a fluid, a total pressure of 16 bar at the end of the fluid supply device, a fluid density of 7.7 $kg/m^3$ at the end of the fluid supply device, a density of the air injected by the injectors of 8.3 $kg/m^3$, and a degree of effectiveness of the diffuser of 0.7 were used as a basis for the input parameters of the simulation. The diffuser is hereby considered to be the channel widening of the fluid supply device in front of the antechamber. The results shown in the figures hereby apply for optimized cross-sections of the recirculation openings and injectors. FIG. 3 shows the pressure loss of the fluid supply device provided for cooling the combustion chamber wall and the combustion chamber above the pressure loss of the entire combustor. It should hereby be considered that according to the specifications the fluid supplied via the injectors just compensates the pressure loss of the burners. This pressure loss of the burners in the form of a pressure loss between the antechamber and the recirculation openings remains unchanged over the entire abscissa range. In contrast, the pressure loss of the fluid supply device rises continuously and at the same time determines the pressure loss over the entire combustor.

FIG. 4 shows above the pressure loss of the combustor the associated fluid mass flux percentage supplied via the fluid supply device to the combustor. In the range of a low pressure loss of the combustor, the fluid mass flux percentage is also very low. Since adequate cooling of the combustion chamber wall requires a certain fluid mass throughput through the fluid supply device, the combustor here can only be operated in a range of a higher pressure loss of the combustor.

FIG. 5 shows the ratio of the cross-section area of the injectors (A2) associated with the respective pressure loss of the combustor to the total cross-section area (A1+A2) of the injectors and the fluid supply device. The cross-section area of the injectors thus decreases with an increasing pressure loss of the combustor.

Figure 6:
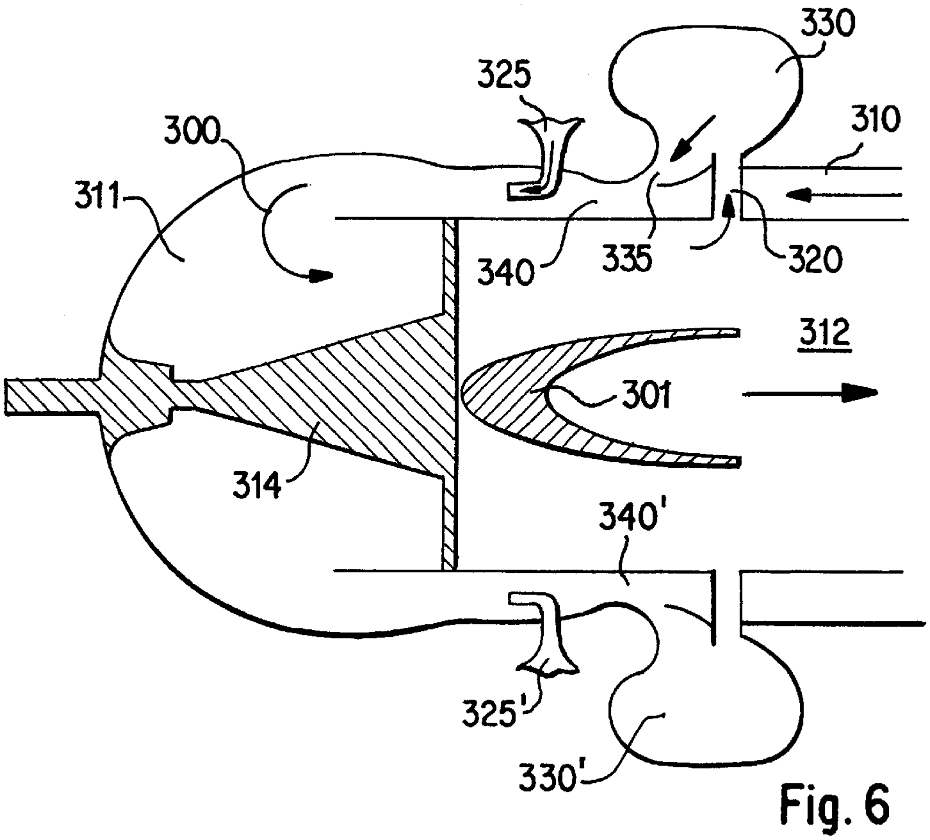
FIG. 6 shows a section through a combustor with a recirculation opening, an attenuation volume, and an injector, whereby the fluid supply device is constructed as a Venturi nozzle in the area of the merging point of the attenuation volume.

The small fluid mass flux shown in FIG. 4 which is fed by the fluid supply device to the combustor is insufficient in some cases, especially when used for cooling the combustion chamber wall. In such cases, the invention can be executed advantageously with an another characteristic in order to increase the fluid mass flux. In the combustor shown in FIG. 6, a smaller mass flux must be supplied via injectors 325, 325'. This results in a greater fluid mass flux through the fluid supply device 310 than in the embodiments of the invention according to FIGS. 1 and 2. The shown combustor is once again constructed as a premixing combustor with a fluid supply device 310, an antechamber 311, a premixing device 314, and a combustion chamber 312 with a terminating front panel in the front. According to the invention, the combustor also has two recirculation openings 320, 320' provided in the front part of the combustion chamber. The recirculation openings 320, 320' are in this case constructed so that at least part of the fluid exiting the combustion chamber flows into one each attenuation volume 330, 330' and is conducted from there into the fluid supply device 310. Furthermore, injectors 325, 325' through which additional, more compressed fluid is fed into the flow are provided upstream from the recirculation openings 320, 320' in the fluid supply device 310. In order to increase the fluid mass flux through the fluid supply device 310, the fluid supply device 310 is constructed in the merging area 335 of the attenuation volumes 330, 330' or the recirculation openings 320, 320' in each case as a Venturi nozzle 340, 340'. The narrowest cross-sections of the Venturi nozzles 340, 340' are located here in the area of the merging points 335 of the attenuation volumes 330, 330' in the fluid supply device 310, slightly downstream from the merging points 335. The areas of the fluid supply device 310 downstream from the narrowest cross-sections of the Venturi nozzles 340, 340' are formed as diffusers of the Venturi nozzles, each of which has a widening cross-section. Because of the arrangement of the Venturi nozzles 340, 340' the static pressure in the fluid supply device 310 in the merging area 335 of the attenuation volumes 330, 330' decreases. Given a reasonable design of the flow cross-sections, the almost identical static pressure as is present in the narrowest cross-sections of the Venturi nozzles 340, 340' develops in the attenuation volumes 330, 330' and thus also in the combustion chamber 312. The static pressure that develops as a result of the cross-section widening and associated reduction in speed of the flow downstream from the narrowest cross-sections of the Venturi nozzles 340, 340' is sufficient to ensure a stabile and clear pressure drop across the burners. The fluid mass flux supplied via the injectors 325, 325' to the combustor thus can be reduced with the smaller flow cross-sections of the injectors. Accordingly, the mass flux that is supplied to the combustor through the fluid supply device 310 and contributes to the cooling of the combustion chamber wall is increased by this.

Figure 7:
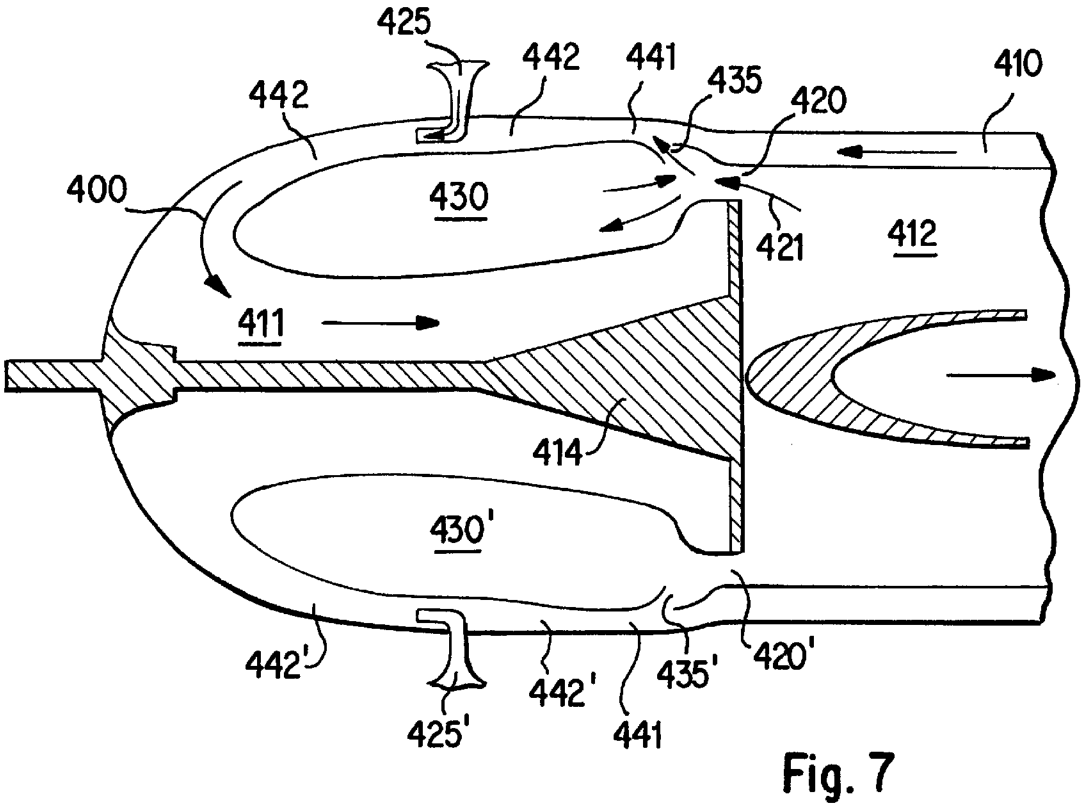
FIG. 7 shows a section through another combustor with a recirculation opening located in the front panel, an attenuation volume, and an injector, whereby the fluid supply device is constructed as a Venturi nozzle in the area of the merging point of the attenuation volume.

FIG. 7 shows another embodiment of the invention. The shown combustor consists of a fluid supply device 410, an antechamber 411, a premixing device 414, and a combustion chamber 412 that is terminated in the front by a front panel. The recirculation openings 420, 420' constructed according to the invention are located on the front panel. At least part of the fluid 421 exiting the combustion chamber 412 flows into the attenuation volumes 430, 430' that are located so as to adjoin the combustion chamber 412 in the front and extend spatially into the antechamber 411. The flow channels between the attenuation volumes 430, 430' and the combustor outside wall which should be regarded as parts of the fluid supply device 410 are here formed in a useful manner as Venturi nozzles. The narrowest cross-sections 441, 441' of the Venturi nozzles each are located slightly downstream from the merging points 435, 435' of the attenuation volumes 430, 430' or, respectively, the recirculation openings 420, 420' in the fluid supply device 410. The diffusers 442, 442', each of which follows the narrowest cross-sections 441, 441' of the Venturi nozzles, each are constructed in two parts. A first part of the diffusers is located in the area between the narrowest cross-section 441, 441' of the Venturi nozzles and the injectors 425, 425'. The second part of the diffusers 442, 442' each is arranged downstream from the injectors 425, 425'. The function of the embodiment of the invention shown in FIG. 7 is equivalent to the function of the embodiment of the invention shown in FIG. 6. Differences between the two embodiments of the invention are found in particular in different design variants and thus in the combustor dimensions.

Figure 8:
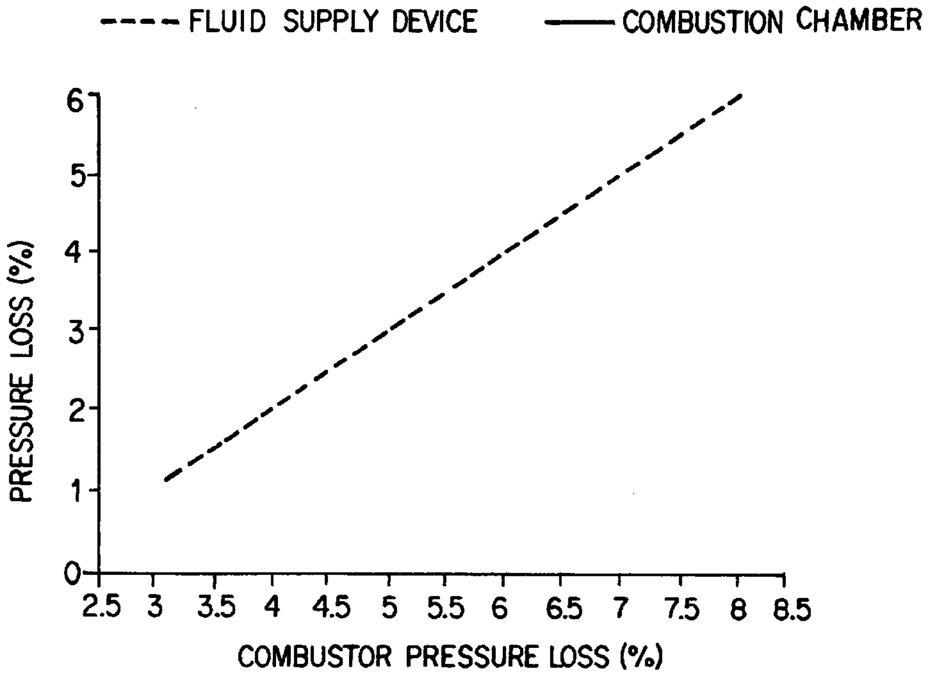
FIG. 8 shows a graphic portrayal of the pressure loss in the fluid supply device and in the combustion chamber, each of which is shown in relation to the pressure loss of the combustor for a combustor with a recirculation opening, an optimized injector, and a fluid supply device constructed as a Venturi nozzle.
Figure 9:
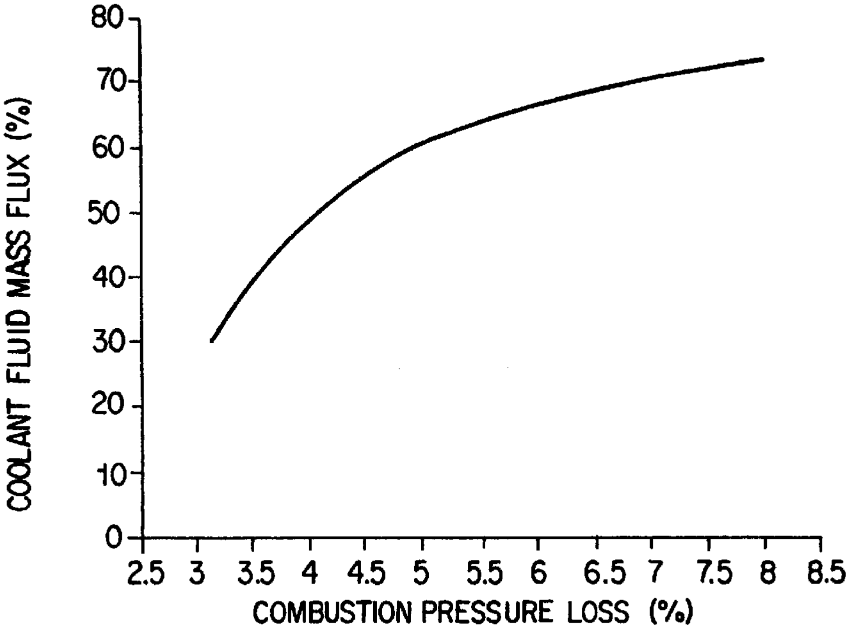
FIG. 9 shows, in reference to the combustor of FIG. 8, a graphic portrayal of the fluid mass throughput supplied through the fluid supply device to the combustor, in relation to the pressure loss of the combustor.
Figure 10:
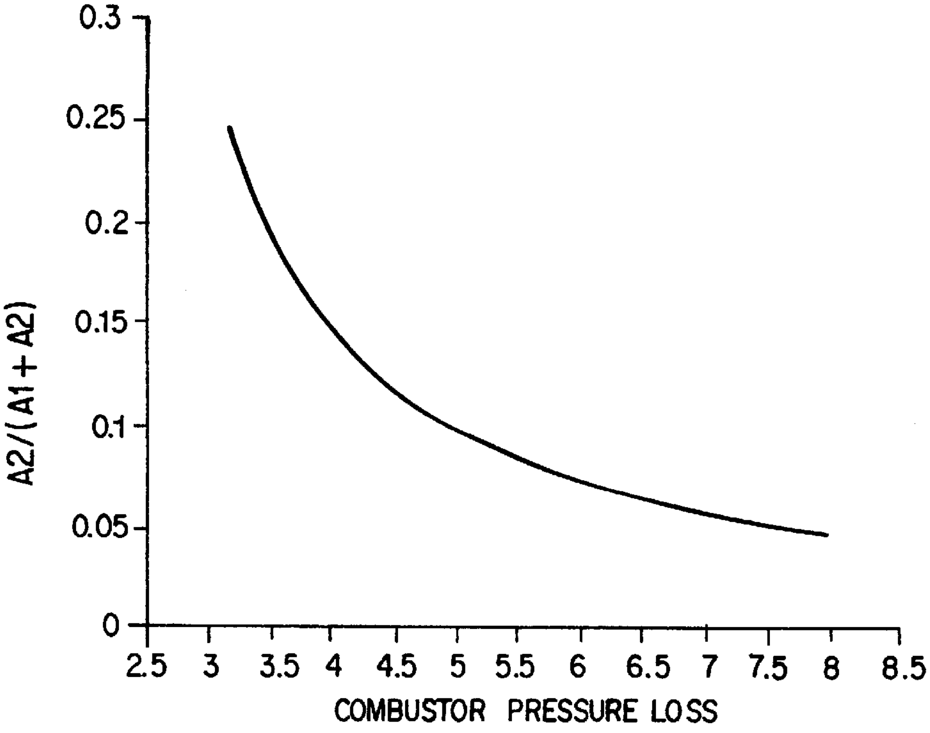
FIG. 10 shows, in reference to the combustor of FIG. 8, a graphic portrayal of the relative cross-section area of the optimized injector in relation to the pressure loss of the combustor.

The results of an arithmetic simulation of an embodiment of the invention corresponding to FIG. 7 are shown in FIGS. 8, 9, and 10. When using air as a fluid, a total pressure of 16 bar at the end of the fluid supply device, a fluid density of 8 $kg/m^3$ at the end of the fluid supply device, a density of 8.3 kg/m3 of the air injected via the injectors, and a degree of effectiveness of the first part of the diffuser of 0.8 and of the second part of the diffuser of 0.5, a flow speed in the Venturi nozzles of 87 m/s, and an increase in the total pressure by 3 promille due to the injection via the injectors were used as a basis for the input parameters of the simulation. Using the same view as FIG. 3, FIG. 8 shows the distribution of the pressure losses within the fluid supply device as well as in the combustion chamber above the pressure loss of the entire combustor. FIG. 9 shows the mass flux percentage that is supplied to the combustor as cooling air through the fluid supply device. Compared to FIG. 4, a clear increase in the share of the fluid mass flux passed via the fluid supply device to the combustion chamber can be seen. FIG. 10, analog to FIG. 5, shows the ratio of the cross-section areas of the injectors (A2) associated with the respective pressure loss to the total cross-section area (A1+A2) of the injectors and the fluid supply device.

Figure 11:
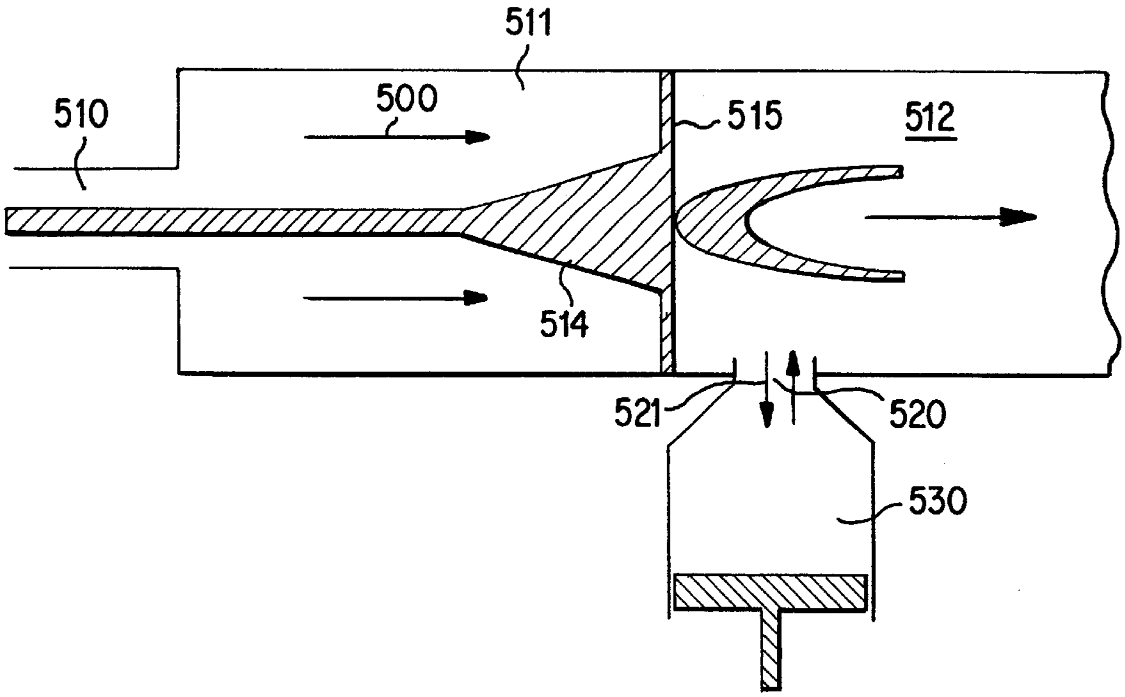
FIG. 11 shows a section through a combustor according to a further embodiment of the invention.

FIG. 11 shows an embodiment of the invention that is especially suitable for determining the optimum volume of the attenuation volume 530 for the effective attenuation of acoustic and/or thermoacoustic oscillations in relationship to the combustor and the respective operating point. The combustor shown here consists of a fluid supply device 510, an antechamber 511, a premixing device 514, and a combustion chamber 512 that is divided in the front by a front panel 515 from the antechamber 511. The fluid supply device 510 in this case is not, as in the previous illustrations, located next to the combustion chamber for cooling the combustion chamber wall. In order to attenuate acoustic and/or thermoacoustic oscillations, an additional recirculation opening 520 was here located in the combustor wall. The recirculation opening 520 merges with an attenuation volume 530. The volume of the attenuation volume 530 may be changed using a movable dividing wall. This makes it possible to vary the attenuation performance across the frequency range. The fluid 521 entering the attenuation volume 530 from the combustion chamber 512 recirculates via the recirculation opening 520 into the combustion chamber 512.

I claim:

1. A combustor for a turbo machine, comprising:

a fluid supply device for a combustion air flow; and a combustion chamber comprising an upstream end and a downstream end, with a front panel arranged at the upstream end, at least one burner arranged at said front panel, said at least one burner being adapted and arranged to receive essentially the full combustion air flow from the fluid supply device; said burner providing a fluid communication for the combustion air flow which is directed from the fluid supply device into the combustion chamber;

at least one opening providing fluid communication between the combustion chamber and the fluid supply device;

wherein a contour of a flow cross section of the fluid supply device is chosen to provide at least one point where the static pressure, under full load conditions, is essentially balanced with respect to a static pressure inside the combustion chamber; and wherein the at least one opening merges with the fluid supply device at said at least one point of balanced static pressure, such that an inflow of fluid from the fluid supply device into the combustion chamber through said at least one opening is essentially avoided.

2. The combustor as claimed in claim 1, wherein the combustor further comprises an antechamber that is located between the fluid supply device and the combustion chamber.

3. The combustor as claimed in claim 1, wherein the combustor is constructed as a premixing combustor and has a premixing device.

4. The combustor as claimed in claim 1, wherein at least part of the fluid supply device is arranged for cooling a combustion chamber wall in counterflow arrangement to the combustion chamber through-flow so as to immediately adjoin the combustion chamber wall.

5. The combustor as claimed in claim 1, wherein the at least one opening is constructed as a nozzle.

6. The combustor as claimed in claim 1, wherein the at least one opening is located on an upstream end of the combustion chamber.

7. The combustor as claimed in claim 1, wherein a narrowest cross-section of the at least one opening is larger than a narrowest cross-section of a corresponding Helmholtz resonator.

8. The combustor as claimed in claim 7, wherein the narrowest cross-section of the at least one opening corresponds at least to ten times the cross-section area of the narrowest cross-section of the Helmholtz resonator with a same sound attenuation performance.

9. The combustor as claimed in claim 1, wherein fluid in an area of a merging point of the opening at least one, has at a base load a compensated static pressure, and at full load a lower static pressure when compared to fluid in the combustion chamber.

10. The combustor as claimed in claim 1, wherein an injector is located so that it merges in an area downstream from the at least one opening, with respect to a supply fluid flow in the fluid supply device, with at least one of the fluid supply device and an antechamber.

11. The combustor as claimed in claim 10, wherein the injector is constructed as a nozzle.

12. The combustor as claimed in claim 10, wherein both the fluid supply device and the injector are connected at a respective free end to a common fluid reservoir.

13. The combustor as claimed in claim 1, wherein an attenuation volume is provided, whereby the attenuation volume is located such that at least part of the fluid flowing from the combustion chamber through the at least one opening flows into the attenuation volume.

14. The combustor as claimed in claim 13, wherein the attenuation volume merges with at least one of the fluid supply device and an antechamber.

15. The combustor as claimed in claim 13, wherein the attenuation volume has a volume of approximately the same size as a primary zone of the combustor.

16. The combustor as claimed in claim 13, wherein a volume of the attenuation volume is adjustable.

17. The combustor as claimed in claim 13, wherein the fluid supply device is constructed in an area of the merging point of the attenuation volume as a Venturi nozzle, whereby a narrowest cross-section of the Venturi nozzle is located in an immediate area of the merging point of the attenuation volume.

18. The combustor as claimed in claim 1, wherein the fluid supply device is constructed in the area of a merging point of the recirculation opening as a Venturi nozzle, whereby a narrowest cross-section of the Venturi nozzle is located in an immediate area of the merging point of the recirculation opening.

19. The combustor as claimed in claim 1, wherein the burner is a premix burner.

20. A method for attenuating at least one of acoustic and thermoacoustic oscillations in the flow of a fluid in a combustor of a turbo machine, wherein the combustor comprises at least one fluid supply device and one combustion chamber, said method comprising:

recirculating a part of the fluid flowing through the combustor and thereby attenuating at least one of the acoustic and thermoacoustic oscillations in the fluid;

wherein at least part of the fluid flowing from the combustion chamber through a recirculation opening is passed first into an attenuation volume and then into at least one of the fluid supply device and an antechamber of the combustor.

21. Method as claimed in claim 20, wherein, in order to produce a clear pressure drop across at least one burner of the combustor, fluid is supplied to the flow by means of an injector that merges downstream from the recirculation opening with at least one of the fluid supply device and an antechamber.

22. Method as claimed in claim 20, wherein a clear pressure drop is produced across at least one burner of the combustor by means of a Venturi nozzle which is located in an area of at least one of a merging point of the recirculation opening and a merging point of the attenuation volume in the fluid supply device.

23. Method as claimed in claim 22, wherein the pressure loss of the combustor is increased by means of the arrangement of the Venturi nozzle.

* * * * *